United States Patent [19]

Fang

[11] 3,835,391

[45] Sept. 10, 1974

[54] VESTIGIAL SIDEBAND SIGNAL GENERATOR

[75] Inventor: Yang Fang, Clarksburg, Md.

[73] Assignee: International Business Machines Corporation, Armonk, N.Y.

[22] Filed: May 21, 1971

[21] Appl. No.: 145,685

[52] U.S. Cl. .................................. 325/136, 332/44
[51] Int. Cl. ........................................... H04b 1/68
[58] Field of Search ....... 325/49, 50, 136, 137, 138; 328/61; 332/31, 44, 45

[56] References Cited

UNITED STATES PATENTS

| | | | |
|---|---|---|---|
| 3,229,232 | 1/1966 | Sosin | 325/136 |
| 3,443,229 | 5/1969 | Becker | 325/49 |
| 3,500,215 | 3/1970 | Leuthold | 325/136 X |
| 3,543,009 | 11/1970 | Voelcker | 325/38 X |
| 3,605,017 | 9/1971 | Chertok et al. | 325/49 |
| 3,639,842 | 2/1972 | Zarcone | 325/136 X |

*Primary Examiner*—Robert L. Griffin
*Assistant Examiner*—Marc E. Bookbinder
*Attorney, Agent, or Firm*—Karl O. Hesse; Hanifin & Jancin

[57] ABSTRACT

A vestigial sideband signal generation method and apparatus suitable for transmission of digital data using a single filter for baseband data wave shaping and vestigial sideband shaping.

8 Claims, 12 Drawing Figures

INVENTOR
YANG FANG

BY Karl O. Hesse
AGENT

VESTIGIAL SIDEBAND SIGNAL GENERATOR

BACKGROUND OF THE INVENTION

Field of the Invention

This invention relates to modulated carrier wave communication systems with asymmetric sidebands.

Description of the Prior Art

Vestigial sideband signal generating systems are known in the prior art, and are known to be preferable over single sideband for transmission of signals which have very low frequency components.

The conventional method of generating vestigial sideband signals includes the following steps:

a. The information to be transmitted is passed through a data shaping filter to limit the bandwidth of the baseband signal to the bandwidth of the transmission medium.

b. The band limited information to be transmitted is then fed into a balanced modulator to modulate a carrier of frequency $f_c$. The balanced modulator provides an output containing an upper and a lower sideband with the carrier suppressed.

c. This double sideband signal is then passed through a vestigial sideband filter, so that the desired vestigial sideband signal can be obtained.

The data shaping filter and the vestigial sideband filter used in the conventional vestigial sideband signal generator are very difficult to design to close approximation of theoretical requirements, especially when sharp rolloff of these filters is required, in order to limit the bandwidth requirements within the available bandwidth of the transmission medium.

Furthermore, sharp rolloff filters introduce delay distortion, which must be equalized. The design of delay distortion equalizers for these sharp rolloff filters is even more difficult when the design of the filters themselves.

Any deviations in the designs of the filters from the theoretical requirements will introduce distortion and degrade the performance of the entire signal generator. It is the above difficulties which account for the fact that only a few successful and also very expensive vestigial sideband generators have been developed for transmission of high speed digital data over bandwidth limited transmission medium. An example of a vestigial sideband signal generator of the prior art is disclosed in an article entitled "Data Modems with Integrated Digital Filter and Modulators" by P. J. Van Gerwen and P. Van Der Wurf which appeared in IEEE Transactions on Communication Technology, Volume Com-18, Number June 3, 1970.

SUMMARY OF THE INVENTION

It is an object of this invention to generate vestigial sideband signals without the use of special data shaping and vestigial sideband wave shaping filters.

It is a further object of this invention to generate vestigial sideband signals using a filter which does not require delay equalization.

It is a still further object of this invention to generate vestigial sideband signals using a single filter which performs the dual functions of shaping the baseband spectrum and shaping the vestigial sideband.

I accomplish the above objects by using new methods to generate the vestigial sideband signal. The new methods are similar in nature to the well-known single sideband phase shift method. However, the methods of my invention include a different step differentiating it from this single sideband phase shift method. The steps of my invention include passing the digital information to be transmitted through a digital filter having two outputs. The first output generates a base band waveform having an amplitude spectrum which is limited to a finite bandwidth as was done in the prior art. The second output of the digital filter generates a transform for generating a vestigial sideband signal, which is the unique feature of my invention. The baseband waveform is used to modulate a first carrier signal and the transform is used to modulate a second carrier signal which is in qradrature phase relationship with the first carrier signal. The two modulated outputs are then summed to provide the vestigial sideband signal directly without further vestigial sideband filtering.

GLOSSARY OF SOME OF THE SYMBOLS USED IN THIS APPLICATION.

$g(t)$ = baseband information signal $g(t)$ = Hilbert transform of $g(t)$ $h'(t)$ = transform of $g(t)$ having sine amplitude rolloff, and $\bar{h}(t)$ = said transform with flat top sampling factor $h''(t)$ = transform of $g(t)$ having linear amplitude rolloff and $\bar{h}''(t)$ = said transform with flat top sampling factor $h'''(t)$ = transform of $g(t)$ having sine phase rolloff, and $\bar{h}'''(t)$ = said transform with flat top sampling factor $h''''(t)$ = transform of $g(t)$ having linear phase rolloff, and $\bar{h}''''(t)$ = said transform with flat top sampling factor $h'''''(t)$ = transform of $g(t)$ having sine amplitude rolloff and linear phase rolloff, and $\bar{h}'''''(t)$ = said transform with flat top sampling factor $S(\omega)$ amplitude spectrum of $g(t)$, $h(t)$, $h'''(t)$ and $h''''(t)$ $S'(\omega)$ amplitude spectrum of $h'(t)$ $\phi(\omega)$ phase spectrum of $h(t)$ $\phi'(\omega)$ phase spectrum of $h'(t)$ $\phi''''(\omega)$ phase spectrum of $h''''(t)$ $v'(t)$ vestigial sideband generated from $g(t)$ and $h'(t)$ $v''''(t)$ vestigial sideband generated from $g(t)$ and $h''''(t)$ Before delving into a detailed description of embodiments of my invention, a short theoretical discussion will be set out to lay the ground work for a better understanding of the essence of my invention, and how it operates.

It is well-known that a single sideband signal can be generated according to the following equation:

$$s(t) = g(t) \cos \omega_c t \pm h(t) \cos (\omega_c t + \pi/2) \tag{1}$$

where $s(t)$ is the single sideband signal, $g(t)$ is the baseband signal, $h(t)$ is the Hilbert transform of $g(t)$ and $\omega_c = 2\pi f_c$ where $f_c$ is the carrier frequency. The plus sign in Eq. (1) gives the upper sideband signal and the minus sign gives the lower sideband signal. This method is called the Phase Shift Method and is shown in FIGS. 1-6-1 on page 30 of "Communication Systems and Techniques" by Schwartz, Bennett, and Stein, published by McGraw-Hill.

Figure 2A:
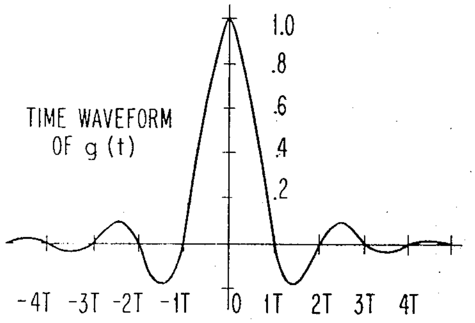
FIG. 2A shows a baseband time waveform containing a single bit of digital information to be transmitted.
Figure 2B:
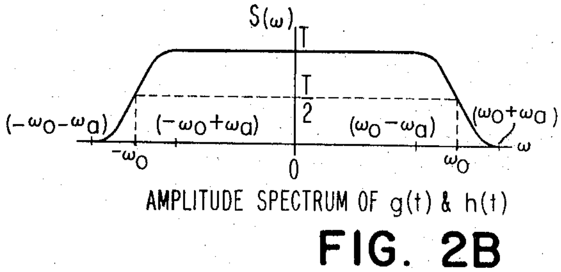
FIG. 2B shows the amplitude spectrum of the waveform of FIG. 2A.

For data transmission, the baseband signal $g(t)$ should be properly data-shaped so that its bandwidth requirement is limited and yet no intersymbol interference will be introduced. One popularly used data shaping is the raised cosine roll-off shaping as shown in FIG. 2B.

Referring again to FIG. 2B, the amplitude spectrum of $g(t)$ which is the same for $h(t)$, has the following values:

$$S(\omega) = \begin{cases} \frac{T}{2}\left[1 + \sin \frac{\pi(\omega+\omega_o)}{2\omega_a}\right] & \text{for } -\omega_o-\omega_a<\omega<-\omega_o+\omega_a \\ T & \text{for } -\omega_o+\omega_a<\omega<\omega_o-\omega_a \\ \frac{T}{2}\left[1 - \sin \frac{\pi(\omega-\omega_o)}{2\omega_a}\right] & \text{for } \omega_o-\omega_a<\omega<\omega_o+\omega_a \\ O & \text{for } |\omega|>\omega_o+\omega_a \end{cases} \tag{2}$$

where $T$ is the transmitting symbol duration and $\omega_0 = \pi/T$ is equal to half of the symbol rate measured in radians, and $\omega_a$ equal to one-half of the bandwidth of raised cosine roll-off (see FIG. 2).

The phase spectrum of $g(t)$ is 0 for all frequencies, therefore $$g(t) = \frac{1}{2\pi}\int_{-\infty}^{\infty} S(\omega) e^{i\omega t} d\omega = \frac{\sin \omega_o t}{\omega_o t} \cdot \frac{\cos \omega_a t}{1-(2\omega_a t/\pi)^2} \tag{3}$$

From Eq. (3) we see that, for an integer $n$, $$g(nT) = 1 \text{ for } n=0 \tag{4}$$

and $$g(nT) = 0 \text{ for } n \neq 0 \tag{5}$$

Thus the raised cosine roll-off data shaping will generate a data pulse free of intersymbol interference, yet its bandwidth is limited to $\omega_o + \omega_a$.

The phase spectrum $\phi(\omega)$ of $h(t)$ is $\pi/2$ for $\omega<0$ and $-\pi/2$ for $\omega \geq 0$ by definition of the Hilbert transform. Therefore, $$\begin{aligned} h(t) &= \frac{1}{2\pi}\int_{-\infty}^{\infty} S(\omega) e^{i\phi(\omega)} e^{i\omega t} d\omega \\ &= \frac{1}{\pi}\int_{0}^{\omega_o+\omega_a} S(\omega) \sin \omega t d\omega \\ &= \frac{1}{\omega_o t}\left[1 - \frac{\cos \omega_o t \cos \omega_a t}{1-(2\omega_a t/\pi)^2}\right] \end{aligned} \tag{6}$$

Theoretically, it is possible to generate a true single sideband signal according to Eq. (1) if the sideband signal $g(t)$ of Eq. (3) and its Hilbert transform $h(t)$ of Eq. (6) can be generated by either analog methods or digital methods.

Although, theoretically possible, it is difficult in practice, to generate true single sideband signals from baseband signals having very low frequency components. This is because it is difficult to generate the Hilbert transform $h(t)$ of a signal $g(t)$ having very low frequency components due to the sudden shift in phase from +90° to −90° at zero frequency. If a shift register, resistor network, and simple low-pass filter are used to generate $h(t)$, an unreasonably long shift register will be required. If the shift register is limited to a reasonable number of stages, the distortion introduced by truncation of the shift register will be very large. Even if a true single sideband signal could be generated, the distortion introduced at the receiver by the demodulation process, due to small carrier phase variations will be very large for those baseband signals with very low frequency components such as in two, four, or eight level data waveforms. For the above reasons, a single sideband system is not the most efficient system which can be used to transmit such information.

A vestigial sideband system, on the other hand, can accurately transmit low frequency baseband signal components with a reasonably efficient use of bandwidth, although, the required bandwidth is wider than that required for true single sideband. The conventional methods of generating vestigial sideband signals have several disadvantages, however, as previously discussed under background of the invention.

Figure 3A:
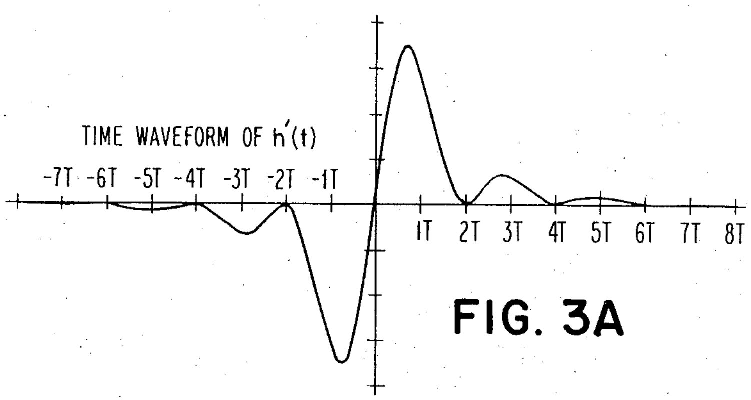
FIG. 3A shows a time waveform of a transform having even symmetry amplitude rolloff about zero frequency, as well as the normal +90° to −90° phase shift at zero frequency.
Figures 3B, 3C, 4A, 4B:
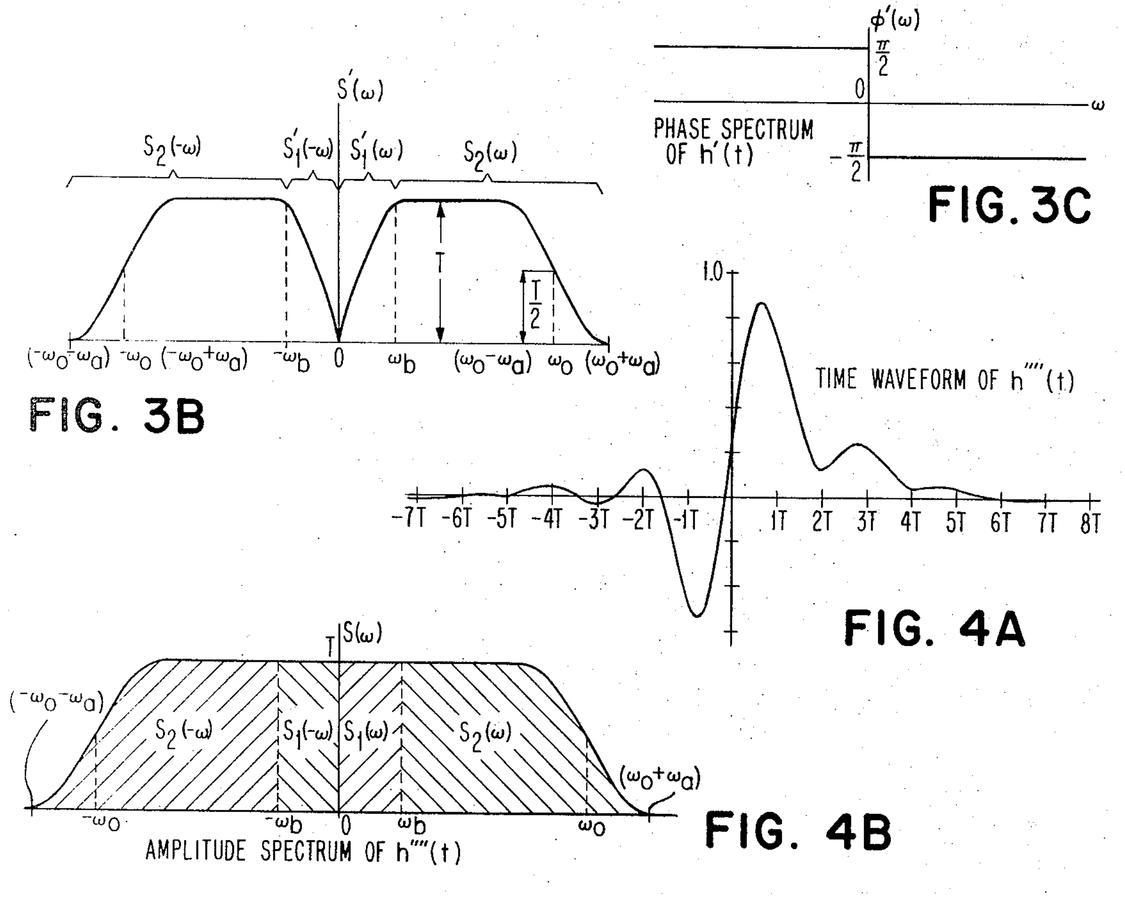
FIG. 3B shows the amplitude spectrum of FIG. 3A.
FIG. 3C shows the phase spectrum of FIG. 3A.
FIG. 4A shows a time waveform of a transform having odd symmetry phase rolloff about zero frequency but having a flat amplitude spectrum.
FIG. 4B shows the amplitude spectrum of FIG. 4A.

I will now set out my new methods of generating a vestigial sideband signal. Instead of generating the Hilbert transform $h(t)$, I generate a function which I have called a transform, i.e., a transform for generating a vestigial sideband signal. FIGS. 3A and 4A show two possible transforms of the baseband data waveform of FIG. 2A. These transforms can easily be generated by the use of a shift register with a reasonable number of stages, a resistor network and a simple low-pass filter. From FIG. 3B, it can be seen that $$\left.\begin{aligned} S_1'(\omega) &= T \sin \frac{\pi\omega}{2\omega_b} & \text{for } 0 \leq \omega < \omega_b \\ S_2(\omega) &= \begin{cases} T & \text{for } \omega_b<\omega<\omega_o-\omega_a \\ \frac{T}{2} 1 - \sin \frac{\pi(\omega-\omega_o)}{2\omega_a} & \text{for } \omega_o-\omega_a<\omega<\omega_o+\omega_a \end{cases} \end{aligned}\right\} \tag{7}$$

where $\omega_b$ equals one-half of the bandwidth of the vestigial sideband (see FIG. 3*b*).
and $$h'(t)=\frac{1}{2\pi}\int_{-\infty}^{\infty} S'(\omega)e^{j\phi'(\omega)}e^{j\omega t}d\omega$$
$$=\frac{T}{\pi}\int_0^{\omega_b}\sin\frac{\pi\omega}{2\omega_b}\sin\omega t d\omega+\frac{1}{\pi}\int_{\omega_b}^{\omega_o+\omega_a} S_2(\omega)\sin\omega t d\omega$$
$$=\frac{1}{\omega_o t}\cdot\left[\frac{\cos\omega_b t}{1-(2\omega_b t/\pi)^2}-\frac{\cos\omega_0 t\cos\omega_a t}{1-(2\omega_a t/\pi)^2}\right] \quad (8)$$

Because of the sine rolloff of the amplitude between $-\omega_b$ and $\omega_b$, the tails of $h'(t)$ are reduced to negligible values within a reasonable number of symbol durations. Thus, $h'(t)$ can easily be generated by shift register and simple low-pass filter.

With $g(t)$ and $h'(t)$, a vestigial sideband signal can be generated according to Eq. (1):

$$v'(t) = g(t)\cos\omega_c t + h'(t)\cos(\omega_c t + \pi/2) \quad (9)$$

In order to see that $v'(t)$ is a vestigial sideband signal, let's rewrite Eq. (9) as $$v'(t) = Re\,[g(t)\,e^{j\omega_c t} + h'(t)e^{j(\omega_c t+\pi/2)}] \quad (10)$$

From FIG. 2B and FIGS. 3B and 3C, we have $$g(t)=\frac{1}{2\pi}\int_{-\omega_o-\omega_a}^{-\omega_b} S_2(-\omega)e^{j\omega t}d\omega+\frac{T}{2\pi}\int_{-\omega_b}^{\omega_b} e^{j\omega t}d\omega \quad (11)$$
$$+\frac{1}{2\pi}\int_{\omega_b}^{\omega_o+\omega_a} S_2(\omega)e^{j\omega t}dw$$

and $$h'(t)=\frac{1}{2\pi}\int_{-\omega_o-\omega_a}^{-\omega_b} S_2(-\omega)e^{j\left(\omega t+\frac{\pi}{2}\right)}dw$$
$$+\frac{1}{2\pi}\int_{-\omega_b}^{0} S_1'(-\omega)e^{j\left(\omega t+\frac{\pi}{2}\right)}dw$$
$$-\frac{1}{2\pi}\int_0^{\omega_b} S_1'(\omega)e^{j\left(\omega t-\frac{\pi}{2}\right)}dw$$
$$+\frac{1}{2\pi}\int_{\omega_b}^{\omega_o+\omega_a} S_2(\omega)e^{j\left(\omega t-\frac{\pi}{2}\right)}dw \quad (12)$$

Substitute Eqs. (11) and (12) into Eq. (10), we obtain $$v'(t)=Re\left[\frac{1}{2\pi}\int_{-\omega_o-\omega_a}^{-\omega_b} S_2(-\omega)e^{j(\omega_o+\omega)t}d\omega\right.$$
$$+\frac{T}{2\pi}\int_{-\omega_b}^{\omega_b} e^{j(\omega_o+\omega)t}dw+\frac{1}{2\pi}\int_{\omega_b}^{\omega_o+\omega_a} S_2(\omega)e^{j(\omega_o+\omega)t}dw$$
$$-\frac{1}{2\pi}\int_{-\omega_o-\omega_a}^{-\omega_b} S_2(-\omega)e^{j(\omega_o+\omega)t}dw$$
$$\left.+\frac{T}{2\pi}\int_{-\omega_b}^{\omega_b}\sin\frac{\pi\omega}{2\omega_b}e^{j(\omega_o+\omega)t}dw+\frac{1}{2\pi}\int_{\omega_b}^{\omega_o+\omega_a} S_2(\omega)e^{j(\omega_o+\omega)t}dw\right]$$
$$=Re\left[\frac{T}{2\pi}\int_{-\omega_b}^{\omega_b}\left(1+\sin\frac{\pi\omega}{2\omega_b}\right)e^{j(\omega_o+\omega)t}dw\right. \quad (13)$$
$$\left.+\frac{1}{\pi}\int_{\omega_b}^{\omega_o+\omega_a} S_2(\omega)e^{j(\omega_o+\omega)t}dw\right]$$

The spectrum of $v'(t)$ can be found by use of Fourier transform:

$$V'(\omega)=\int_{-\infty}^{\infty} V'(t)e^{-j\omega t}dt \quad (14)$$

From the Fourier transform pair $$f(t)=\frac{1}{2\pi}\int_{-\infty}^{\infty} F(w)e^{j\theta(w)}e^{jwt}dw \quad (15)$$

where $F(\omega)$ and $\theta(\omega)$ are the amplitude and phase spectra of $f(t)$ respectively, and $$F(\Omega)e^{j\theta(\Omega)}=\int_{-\infty}^{\infty} f(t)e^{-j\Omega t}dt$$
$$=\frac{1}{2\pi}\int_{-\infty}^{\infty}\int_{-\infty}^{\infty} F(w)e^{j\theta(w)}e^{jwt}dw e^{-j\Omega t}dt \quad (16)$$

it is easy to find $V'(\omega)$ by substituting Eq. (13) into Eq. (14) and comparing it with Eq. (16). The result is $$V'(\omega)=\begin{cases}2S_2(\omega-\omega_o)\\ T\left[1+\sin\frac{\pi(\omega-\omega_o)}{2\omega_b}\right]\end{cases} \quad (17)$$

Figure 5:
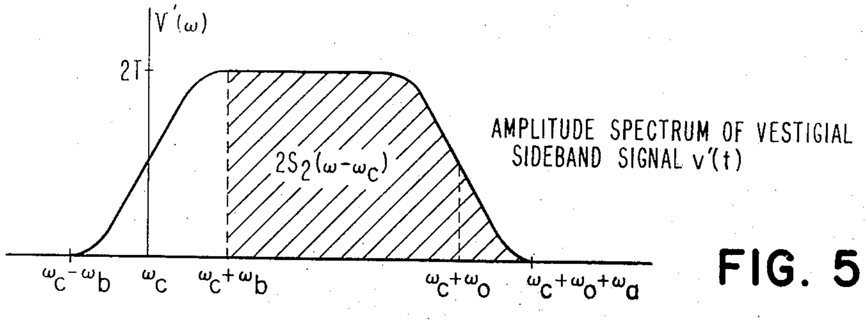
FIG. 5 shows amplitude spectrum of vestigial sidebands generated using transforms of FIG. 3A.

The phase spectrum of $v'(t)$ is $=0$. The amplitude spectrum $|V'(\omega)| = V'(\omega)$ is shown in FIG. 5.

It can be seen from Eq. (17) and FIG. 5 that $v'(t)$ is a vestigial sideband signal. It is well-known that when this vestigial sideband signal $v'(t)$ is demodulated by the carrier $\cos\omega_c t$, the desired baseband signal $g(t)$ will be obtained. This fact can be shown as follows:

By using Eq. (19), the demodulated signal can be expressed as $$D'(t)=v'(t)\cos\omega_c t=g(t)\cos^2\omega_c t-h'(t)\sin\omega_c t\cos\omega_c t$$
$$= 1/2g(t) + 1/2g(t)\cos 2\omega_c t - 1/2h'(t)\sin 2\omega_c t \quad (18)$$

Since $g(t)$ and $h'(t)$ are band limited signals and their bandwidths are less than $\omega_c$, the desired baseband signal $g(t)$ can be obtained by post demodulation low-pass filtering the demodulated signal $D'(t)$ in Eq. (18).

Figure 4C:
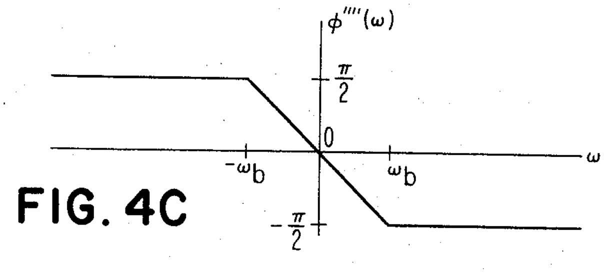
FIG. 4C shows the phase spectrum of FIG. 4A.

An alternate embodiment of my invention is to generate a transform having a phase spectrum with odd symmetry rolloff about zero frequency such as is shown in FIG. 4C and an amplitude spectrum as shown in 4B. I will now discuss the theory of operation of this embodiment in order that the detailed description of this embodiment which follows will be more clear.

From FIG. 4C we see that $$\phi''''(\omega)=\begin{cases}\frac{\pi}{2} & \text{for } \omega<-\omega_b\\ -\frac{\pi}{2}\cdot\frac{\omega}{\omega_b} & \text{for } -\omega_b<\omega<\omega_b\\ -\frac{\pi}{2} & \text{for } \omega>\omega_b\end{cases} \quad (19)$$

With amplitude spectrum $S(\omega)$ and phase spectrum $\phi''''(\omega)$, a function of $h''''(t)$ can be found as follows:

$$h''''(t)=\frac{1}{\pi}\int_0^{\omega_b} S(\omega)\cos\left(\omega t-\frac{\pi\omega}{2\omega_b}\right)d\omega$$
$$+\frac{1}{\pi}\int_{\omega_b}^{\omega_o+\omega_a} S(\omega)\sin\omega t d\omega$$
$$=\frac{1}{\pi}\int_0^{\omega_b} S(\omega)\cos\left(\omega t-\frac{\pi\omega}{2\omega_b}\right)d\omega$$
$$+\frac{1}{\pi}\int_0^{\omega_o+\omega_a} S(\omega)\sin\omega t d\omega-\frac{1}{\pi}\int_0^{\omega_b} S(\omega)\sin\omega t d\omega$$
$$=\frac{1}{\omega_o t}\cdot\left[\cos\omega_b t-\frac{\cos\omega_o t\cos\omega_a t}{1-(2\omega_a t/\pi)^2}\right]$$
$$+\frac{1}{\omega_o t}\cdot\frac{2\omega_b t}{\pi}\cdot\frac{\cos\omega_b t}{1-(2\omega_b t/\pi)} \quad (20)$$

If $\omega_a = \omega_b$, Eq. (20) can be reduced to $$h''''(t) = \cos\omega_a t/\omega_0 t \cdot [1/1 - (2\omega_a t/\pi) - \cos\omega_0 t/1 - (2\omega_a t/\pi)^2] \qquad (21)$$

Because of the linear phase change between $-\omega_b$ and $\omega_b$, the tails of $h''''(t)$ are reduced to negligible values within a reasonable number of symbol durations. Thus $h''''(t)$ can easily be generated by shift register and simple low-pass filter.

With $g(t)$ and $h''''(t)$, a vestigial sideband signal can be generated according to Eq. (1).

$$v''''(t) = g(t)\cos\omega_c t + h''''(t)\cos(\omega_c t + \pi/2) \qquad (22)$$

In order to see that $v''''(t)$ is a vestigial sideband signal, let's rewrite Eq. (22) as $$v''''(t) = Re\,[g(t)e^{j\omega_c t} + h''''(t)e^{j(\omega_c t + \pi/2)}] \qquad (23)$$

In FIG. 4B, the amplitude spectrum $S(\omega)$ is divided into four parts such that $$S(\omega) = S_2(-\omega) + S_1(-\omega) + S_1(\omega) + S_2(\omega)$$
$$S_2(\omega) = S_2(-\omega)$$
$$S_1(\omega) = S_1(-\omega) = T \qquad (24)$$

thus, $$g(t) = \frac{1}{2\pi}\int_{-\omega_o-\omega_a}^{-\omega_b} S_2(-\omega)e^{j\omega t}d\omega - \frac{T}{2\pi}\int_{-\omega_b}^{\omega_b} e^{j\omega t}d\omega + \frac{1}{2\pi}\int_{\omega_b}^{\omega_o+\omega_a} S_2(\omega)e^{j\omega t}d\omega \qquad (25)$$

and $$h''''(t) = \frac{1}{2\pi}\int_{-\omega_o-\omega_a}^{-\omega_b} S_2(-\omega)e^{j(\omega t+\pi/2)}d\omega + \frac{T}{2\pi}\int_{-\omega_b}^{\omega_b} e^{j\left(\omega t - \frac{\pi\omega}{2\omega_b}\right)}d\omega + \frac{1}{2\pi}\int_{\omega_b}^{\omega_o+\omega_a} S_2(\omega)e^{j(\omega t-\pi/2)}d\omega \qquad (26)$$

Substitute Eqs. (25) and (26) into Eq. (23), we obtain $$v''''(t) = Re\Big[\frac{1}{2\pi}\int_{-\omega_o-\omega_a}^{-\omega_b} S_2(-\omega)e^{j(\omega_o+\omega)t}d\omega + \frac{T}{2\pi}\int_{-\omega_b}^{\omega_b} e^{j(\omega_o+\omega)t}d\omega + \frac{1}{2\pi}\int_{\omega_b}^{\omega_o+\omega_a} S_2(\omega)e^{j(\omega_o+\omega)t}d\omega - \frac{1}{2\pi}\int_{-\omega_a-\omega_a}^{-\omega_b} S_2(-\omega)e^{j(\omega_o+\omega)t}d\omega + \frac{T}{2\pi}\int_{-\omega_b}^{\omega_b} e^{j\left(\omega_o t + \frac{\pi}{2} + \omega t - \frac{\pi\omega}{2\omega_b}\right)}d\omega + \frac{1}{2\pi}\int_{\omega_b}^{\omega_o+\omega_a} S_2(\omega)e^{j(\omega_o+\omega)t}d\omega\Big]$$

$$= Re\Big\{\frac{T}{2\pi}\int_{-\omega_b}^{\omega_b}\Big[1 + e^{j\frac{\pi}{2}\left(1-\frac{\omega}{\omega_b}\right)}\Big]e^{j(\omega_o+\omega)t}d\omega + \frac{1}{\pi}\int_{\omega_b}^{\omega_o+\omega_a} S_2(\omega)e^{j(\omega_o+\omega)t}d\omega\Big\} \qquad (27)$$

The complex spectrum $V''''(\omega)$ of $v''''(t)$ can be obtained by applying Fourier transform to $v''''(t)$:

$$V''''(\omega) = \int_{-\infty}^{\infty} v''''(t)e^{-j\omega t}dt \qquad (28)$$

Substituting Eq. (27) into Eq. (28) and comparing the results with Eq. (16), we obtain $$V''''(\omega) = \begin{cases} 2S_2(\omega-\omega_o) & \text{for } \omega_o+\omega_b<\omega<\omega_o+\omega_o+\omega_a \\ T\Big[1 + e^{j\frac{\pi}{2}\left(1-\frac{\omega-\omega_o}{\omega_b}\right)}\Big] & \text{for } \omega_o-\omega_b<\omega<\omega_o+\omega_b \end{cases} \qquad (29)$$

From Eq. (29), we can derive $|V''''(\omega)|$ = amplitude spectrum of $v''''(t)$ $$|V''''(\omega)| = \begin{cases} 2S_2(\omega-\omega_o) & \text{for } \omega_o+\omega_b<\omega<\omega_o+\omega_o+\omega_a \\ T\sqrt{\Big[1+\sin\frac{\pi(\omega-\omega_o)}{2\omega_b}\Big]^2 + \cos^2\frac{\pi(\omega-\omega_c)}{2\omega_b}} & \text{for } \omega_o-\omega_b<\omega<\omega_o+\omega_b \end{cases} \qquad (30)$$

and $\alpha(\omega)$ = phase spectrum of $v''''(t)$ $$\alpha(\omega) = \begin{cases} 0 & \text{for } \omega_o+\omega_b<\omega<\omega_o+\omega_o\times\omega_a \\ \tan^{-1}\dfrac{\cos\frac{\pi(\omega-\omega_o)}{2\omega_b}}{1+\sin\frac{\pi(\omega-\omega_o)}{2\omega_b}} & \text{for } \omega_o-\omega_b<\omega<\omega_o+\omega_b \end{cases} \qquad (31)$$

Figure 6A:
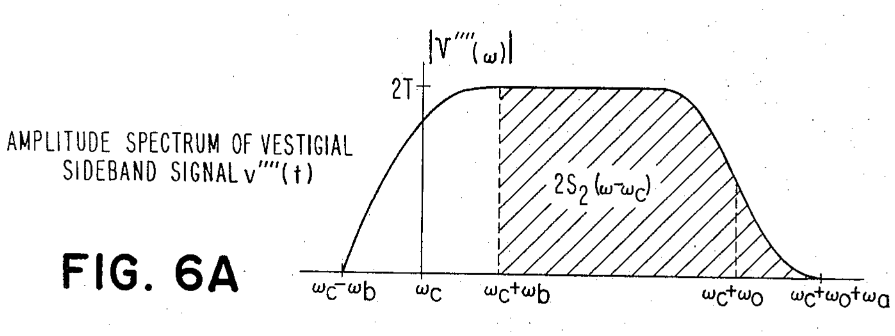
FIG. 6A shows the amplitude spectrum of a vestigial sideband generated from a transform having odd symmetry linear phase rolloff about zero frequency.
Figure 6B:
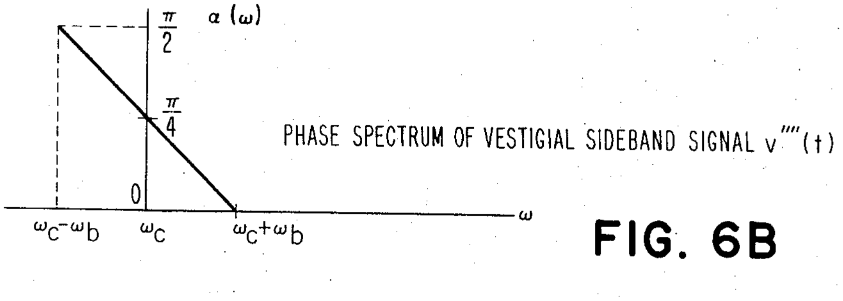
FIG. 6B shows the phase spectrum of the vestigial sideband of FIG. 6A.

$|V''''(\omega)|$ and $\alpha(\omega)$ are shown in FIG. 6A and 6B respectively.

This vestigial sideband signal is different from the conventional VSB signal in that within the band from $\omega_c - \omega_b$ to $\omega_c + \omega_b$ the frequency components have special amplitude and phase relationships.

Although this vestigial sideband signal generated by Eq. (22) is different from the vestigial sideband signal generated by Eq. (9), it can easily be shown that this vestigial sideband signal $v''''(t)$ will also give the desired baseband signal $g(t)$ when it is demodulated by the carrier $\cos\omega_c t$.

From Eq. (22), we see that the demodulated signal is $$D''''(t) = v''''(t)\cos\omega_c t = g(t)\cos^2\omega_c t - h''''(t)\sin\omega_c t\cos\omega_c t = 1/2\,g(t) + 1/2 g(t)\cos 2\omega_c t - 1/2\,h''''(t)\sin 2\omega_c t \qquad (32)$$

Since $g(t)$ and $h''''(t)$ are band limited signals and their bandwidths are less than $\omega_c$, the desired baseband signal $g(t)$ can be obtained by post-demodulation low-pass filtering the demodulated signal $D''''(t)$ in Eq. (32).

Figure 1:
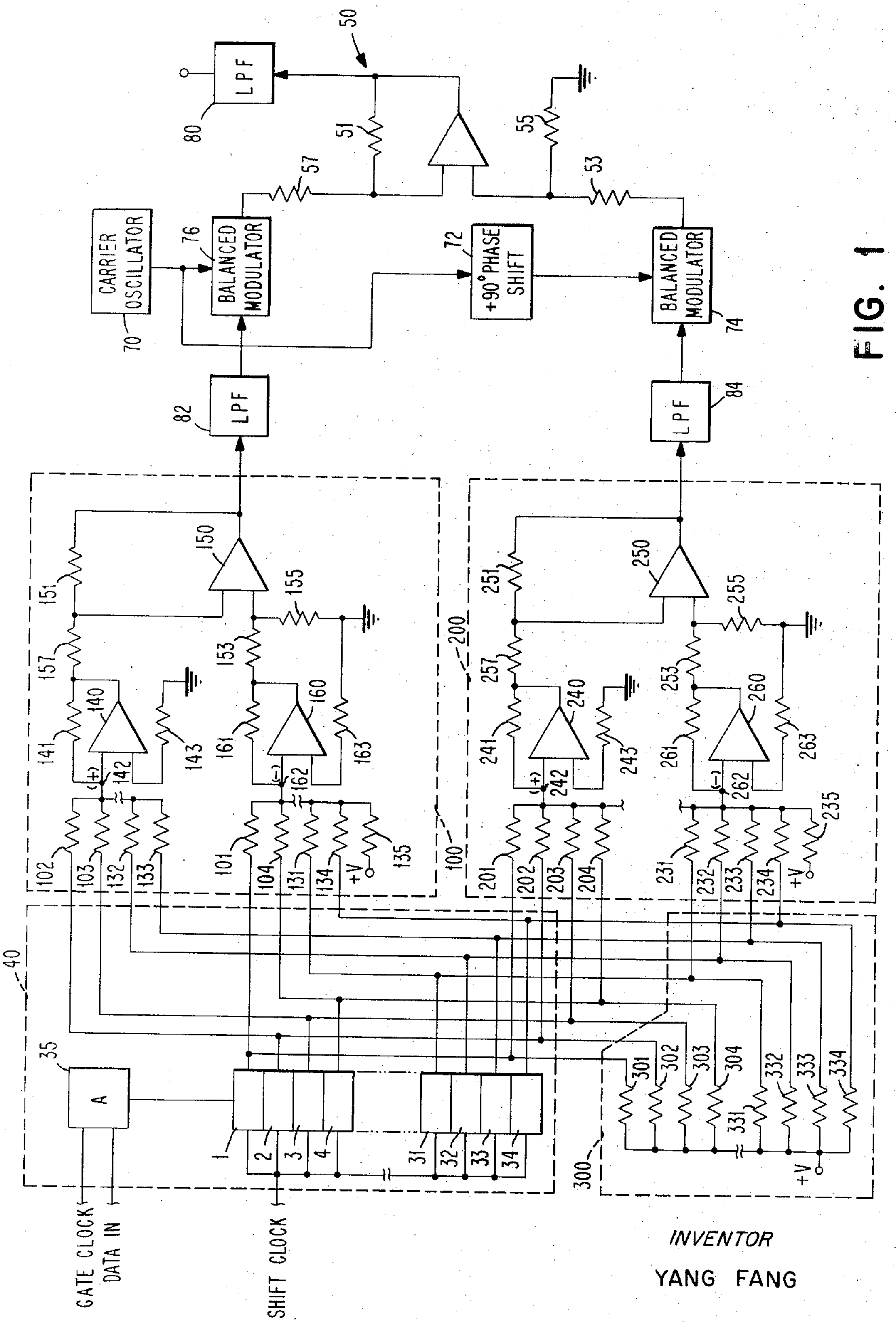
FIG. 1 shows an embodiment of the apparatus of Applicant's invention. The values of the resistors in networks 100 and 200 distinguish Applicant's apparatus of FIG. 1, from apparatus of the prior art. The values of the resistors can be found from tables in the body of the specification.

Having set out the theory of operation of two embodiments of my invention, I will now describe the apparatus shown in FIG. 1 for implementing my invention.

In order to generate samples of a baseband data waveform and its transform, a serial memory means 40 is provided. Any serial memory having an output at each memory stage would be suitable, however, a shift register is ideally suited. Therefore, in my preferred embodiment, serial memory means 40 is composed of a plurality of shift register stages. Each stage has a shift clock input, in order to propagate data from one stage to the next and thereby through the entire register. I have chosen to use 34 shift register stages. Each shift register stage has a data output available for external connection and a data output connected to a data input of a following shift register stage. Serial memory means 40 includes an AND gate 35 at its input. A first input to AND gate 35 is the data to be transmitted and a second input to AND gate 35 is a gate clock signal which enables AND gate 35 to pass the data into the first shift register stage.

A baseband sample generator network 100 is provided for generating a first waveform having an amplitude spectrum which is limited to a finite bandwidth and which contains the digital information to be transmitted. Baseband sample generator network 100 includes a plurality of weighting resistors such as resistors 101 through 104 and 131 through 134. One terminal of each of the above identified resistors is connected to an output of a shift register stage 1 through 4 and 31 through 34 respectively. The other terminal of each of the above resistors is connected to one of nodes 142 or 162 of a summing circuit. Additional resistors 105 throuh 130 are similarly connected to shift register stages 5 through 30 and nodes 142 or 162 as indicated in Table I. The summing circuit of network 100 comprises three operational amplifiers 140, 150, and 160 and their associated summing, feedback and bias resistors. An example operational amplifier which could be used in this application is μA709C or μA715C manufactured by Fairchild Semiconductor Corp. The summing circuit of network 100 has a positive input node 142 and a negative input node 162 which corresponds to the negative inputs to operational amplifiers 140 and 160 respectively. Amplifiers 140 and 160 have feedback resistors 141 and 161 respectively connected between their output and their negative input. The values of resistors 141 and 161 are chosen according to well-known design criteria relating to summing amplifier design using operational amplifiers. The value of the feedback resistor in turn controls the choice of values for the weighting resistors. For example, let us chose +V = +5 volts, feedback resistor 161 = 1000 ohms, and a summing amplifier reference voltage = +3 volts at $t/T$ = 0 as shown in FIG. 2A. Then weighting resistor 101 must be approximately equal to (1000 ohms/0.0024) (5 volts/3 volts) or 694,000 ohms. The value 0.0024 is obtained from Table I. The remaining weighting resistors are chosen in like manner according to the values of Table I. Those weighting resistors connected to node 142 will make a positive contribution to the final sum and those weighting resistors connected to node 162 will make a negative voltage contribution to the final output baseband waveform.

The values of Table I are the same for all the embodiments of my invention set forth in this specification, and are a tabulation of the following equation.

$$\bar{g}(t)=\frac{T}{\pi}\int_0^{3\omega_0/4}\frac{\pi\omega/4\omega_0}{\sin(\pi\omega/4\omega_0)}\cos\omega t d\omega + \frac{T}{2\pi}\int_{3\omega_c/4}^{5\omega_c/4}\left[1-\sin\frac{\pi(\omega-\omega_o)}{\omega_o/2}\right]\cdot\frac{\pi\omega/4\omega_o}{\sin\frac{\pi\omega}{4\omega_o}}\cos\omega t d\omega \quad (33)$$

The values for $\bar{g}(t)$ obtained from Eq. (33) include compensation for the sin $(\pi\omega/4\omega_o)/(\pi\omega/4\omega_o)$ flat top sampling factor introduced by shift register 40. The flat top sampling factor is also included in Eqs. (34), (35), (36), and (37).

The amplifier 140 has a bias resistor 143 connected between its positive input and ground, and the amplifier 160 has a bias resistor 163 connected between its positive input and ground. There is another bias resistor 135 connected between the negative summing node 162 and a positive DC voltage supply +V. Bias resistor 135 will introduce a negative DC voltage in the final output baseband waveform so that no DC component will be present in the final baseband waveform when random digital information is being transmitted. The output of amplifier 140 is connected through a summing resistor 157 to the negative input of amplifier 150. The output of amplifier 160 is connected through a summing resistor 153 to the positive input of amplifier 150. Feedback resistor 151 and bias resistor 155 are chosen to make amplifier 150 act as a unity gain summing amplifier which has an output signal voltage which is the instantaneous sum of the voltage of the outputs of amplifier 140 and 160.

TABLE I

NORMALIZED NUMERICAL VALUES OF $\bar{g}(t)$ $R_{weighting}$ = $K$ / Value of $|\bar{g}(t)|$ where $K$ is a constant which depends on the values chosen for +V, $R_{feedback}$, and the desired summing amplifier output voltage.

| Shift Register Stage | Value of $\lvert\bar{g}(t)\rvert$ | Node Connection | t/T |
|---|---|---|---|
| 1 | .0024 | − | −8.25 |
| 2 | .0017 | + | −7.75 |
| 3 | .0019 | + | −7.25 |
| 4 | .0026 | − | −6.75 |
| 5 | .0012 | − | −6.25 |
| 6 | .0012 | − | −5.75 |
| 7 | .0055 | − | −5.25 |
| 8 | .0080 | + | −4.75 |
| 9 | .0169 | + | −4.25 |
| 10 | .0248 | − | −3.75 |
| 11 | .0413 | − | −3.25 |
| 12 | .0530 | + | −2.75 |
| 13 | .0845 | + | −2.25 |
| 14 | .1119 | − | −1.75 |
| 15 | .1906 | − | −1.25 |
| 16 | .2808 | + | −0.75 |
| 17 | .9265 | + | −0.25 |
| 18 | .9265 | + | +0.25 |
| 19 | .2808 | + | +0.75 |
| 20 | .1906 | − | +1.25 |
| 21 | .1119 | − | +1.25 |
| 22 | .0845 | + | +2.25 |

TABLE I – Continued

NORMALIZED NUMERICAL VALUES OF $\bar{g}(t)$ $R_{weighting}$ = K / Value of $|\bar{g}(t)|$ where K is a constant which depends on the values chosen for +V, $R_{feedback}$, and the desired summing amplifier output voltage.

| Shift Register Stage | Value of $\|\bar{g}(t)\|$ | Node Correction | t/T |
|---|---|---|---|
| 23 | .0530 | + | +2.75 |
| 24 | .0413 | – | +3.25 |
| 25 | .0248 | – | +3.75 |
| 26 | .0169 | + | +4.25 |
| 27 | .0080 | + | +4.75 |
| 28 | .0055 | – | +5.25 |
| 29 | .0012 | – | +5.75 |
| 30 | .0012 | – | +6.25 |
| 31 | .0026 | – | +6.75 |
| 32 | .0019 | + | +7.25 |
| 33 | .0017 | + | +7.75 |
| 34 | .0024 | – | +8.25 |

TABLE II

NORMALIZED NUMERICAL VALUES OF $\bar{h}'(t)$ $R_{weighting}$ = K / Value of $|\bar{h}'(t)|$ where K is a constant which depends on the values chosen for +V, $R_{feedback}$, and the desired summing amplifier output voltage.

| Shift Register Stage | Value of $\|\bar{h}'(t)\|$ | Node Connection | t/T |
|---|---|---|---|
| 1 | .0006 | + | –8.25 |
| 2 | .0006 | + | –7.75 |
| 3 | .0054 | + | –7.25 |
| 4 | .0054 | + | –6.75 |
| 5 | .0000 | None | –6.25 |
| 6 | .0000 | None | –5.75 |
| 7 | .0095 | – | –5.25 |
| 8 | .0220 | – | –4.75 |
| 9 | .0056 | – | –4.25 |
| 10 | .0056 | – | –3.75 |
| 11 | .0861 | – | –3.25 |
| 12 | .1310 | – | –2.75 |
| 13 | .0263 | – | –2.25 |
| 14 | .0263 | – | –1.75 |
| 15 | .3967 | – | –1.25 |
| 16 | .7324 | – | –0.75 |
| 17 | .3927 | – | –0.25 |
| 18 | .3927 | – | +0.25 |
| 19 | .7324 | + | +0.75 |
| 20 | .3967 | + | +1.25 |
| 21 | .0263 | + | +1.75 |
| 22 | .0263 | + | +2.25 |
| 23 | .1310 | + | +2.75 |
| 24 | .0861 | + | +3.25 |
| 25 | .0056 | + | +3.75 |
| 26 | .0056 | + | +4.25 |
| 27 | .0220 | + | +4.75 |
| 28 | .0095 | + | +5.25 |
| 29 | .0000 | None | +5.75 |
| 30 | .0000 | None | +6.25 |
| 31 | .0045 | – | +6.75 |
| 32 | .0054 | – | +7.25 |
| 33 | .0006 | – | +7.75 |
| 34 | .0006 | – | +8.25 |

In order to generate a transform of the baseband data waveform, a transform sample generator network 200 is provided. Network 200 is identical in all respects to the network 100 with the exception that its resistor values and the summing nodes to which they are connected are different. The relative resistor values and their connections for network 200 are set forth in Tables II and III for two possible embodiments of my invention. Table II is a tabulation of the following equation (34) which defines a transform having even symmetry sinusoidal amplitide rolloff about zero frequency.

$$\bar{h}'(t)=\frac{T}{\pi}\int_0^{\omega_o/4}\frac{\pi\omega/4\omega_o}{\sin\frac{\pi\omega}{4\omega_o}}\cdot\sin\frac{2\pi\omega}{\omega_o}\sin\omega t d\omega+\frac{T}{\pi}\int_{\omega_o/4}^{3\omega_o/4}\frac{\pi\omega/4\omega_o}{\sin\frac{\pi\omega}{4\omega_o}}\sin\omega t d\omega+\frac{T}{2\pi}\int_{3\omega_o/4}^{5\omega_o/4}\left[1-\sin\frac{\pi(\omega-\omega_o)}{\omega_o/2}\right]\frac{\pi\omega/4\omega_o}{\sin\frac{\pi\omega}{4\omega_o}}\sin\omega t d\omega \quad (34)$$

A second embodiment could utilize a transform having even symmetry linear amplitide rolloff about zero frequency. The equation (35) below defines this transform.

$$\bar{h}''(t)=\frac{T}{\pi}\int_0^{\omega_b}\frac{\pi\omega/4\omega_o}{\sin(\pi\omega/4\omega_o)}\cdot\frac{\omega}{\omega_b}\sin\omega t d\omega+\frac{T}{\pi}\int_{\omega_b}^{\omega_o-\omega_a}\frac{\pi\omega/4\omega_o}{\sin(\pi\omega/4\omega_o)}\sin\omega t d\omega+\frac{T}{2\pi}\int_{\omega_o-\omega_a}^{\omega_o+\omega_a}\left[1-\sin\frac{\pi(\omega-\omega_o)}{2\omega_a}\right]\frac{\pi\omega/4\omega_o}{\sin\frac{\pi\omega}{4\omega_o}}\sin\omega t d\omega \quad (35)$$

A third embodiment of my invention could utilize a transform having odd symmetry sinusoidal phase rolloff about zero frequency. The equation (36) below, defines such a transform.

$$\bar{h}'''(t)=\frac{T}{\pi}\int_0^{\omega_b}\frac{\pi\omega/4\omega_o}{\sin\,(\pi\omega/4\omega_o}\cos\left(\omega t-\sin\frac{\pi\omega}{2\omega_b}\right)dw$$

$$+\frac{T}{\pi}\int_{\omega_b}^{\omega_o\omega_a}\frac{\pi\omega/4\omega_o}{\sin\,(\pi\omega/4\omega_o)}\sin\omega t d\omega$$

$$+\frac{T}{2\pi}\int_{\omega_o-\omega_a}^{\omega_o-\omega_a}1-\sin\frac{\pi(\omega-\omega_o)}{2\omega_a}\Bigg]\frac{\pi\omega/4\omega_o}{\sin\frac{\pi\omega}{4\omega_o}}\sin\omega t d\omega \quad (36)$$

A fourth embodiment of my invention could utilize a transform having odd symmetry linear phase rolloff about zero frequency. The equation (37) below defines such a transform and Table III is a tabulation of the values obtained from this equation.

$$\bar{h}''''(t)=\frac{T}{\pi}\int_0^{\frac{\omega_o}{4}}\frac{\pi\omega/4\omega_o}{\sin\,(\pi\omega/4\omega_o)}\cos\left(\omega t-\frac{2\pi\omega}{\omega_o}\right)d\omega$$

$$+\frac{T}{\pi}\int_{\frac{\omega_o}{4}}^{\frac{3\omega_o}{4}}\frac{\pi\omega/4\omega_o}{\sin\,(\pi\omega/4\omega_o)}\sin\omega t d\omega$$

$$+\frac{T}{2\pi}\int_{\frac{3\omega_o}{4}}^{\frac{5\omega_o}{4}}\left[1-\sin\frac{\pi(\omega-\omega_o)}{\omega_o/2}\right]\frac{\pi\omega/4\omega_o}{\sin\frac{\pi\omega}{4\omega_o}}\sin\omega t d\omega \quad (37)$$

Additional embodiments of my invention could utilize transforms having both even symmetry amplitude rolloff and odd symmetry phase rolloff about zero frequency Equation (38) below defines a transform having both even symmetry sinusoidal amplitude rolloff and odd symmetry linear phase rolloff about zero frequency. It will be seen by those skilled in the art that the other combinations of: sinusoidal amplitude-sinusoidal phase rolloff; linear amplitude-sinusoidal phase rolloff; and linear amplitude-linear phase rolloff; can be used as well without departing from the spirit and scope of my invention.

$$\bar{h}'''''(t)=\frac{T}{\pi}\int_0^{\omega_b}\frac{\pi\omega/4\omega_o}{\sin\frac{\pi\omega}{4\omega_o}}\sin\frac{\pi\omega}{2\omega_b}\cos\left(\omega t-\frac{\pi\omega}{2\omega_b}\right)d\omega$$

$$+\frac{T}{\pi}\int_{\omega_b}^{\omega_o-\omega_a}\frac{\pi\omega/4\omega_o}{\sin\frac{\pi\omega}{4\omega_o}}\sin\omega t d\omega$$

$$+\frac{T}{2\pi}\int_{\omega_o-\omega_a}^{\omega_o+\omega_a}\left[1-\sin\frac{\pi(\omega-\omega_o)}{2\omega_a}\right]\frac{\pi\omega/4\omega_o}{\sin\frac{\pi\omega}{4\omega_o}}\sin\omega t d\omega \quad (38)$$

TABLE III

NORMALIZED NUMERICAL VALUES OF $\bar{h}''''(t)$ $R_{weighting}$ = $K$ / Values of $|\bar{h}''''(t)|$ where $K$ is a constant which depends on the values chosen for +V, $R_{feedback}$, and the desired summing amplifier output voltage.

| Shift Register Stage | Value of $\lvert\bar{h}''''(t)\rvert$ | Node Connection | t/T |
|---|---|---|---|
| 1 | .0097 | – | –8.25 |
| 2 | .0111 | – | –7.75 |
| 3 | .0061 | – | –7.25 |
| 4 | .0046 | – | –6.75 |
| 5 | .0041 | – | –6.25 |
| 6 | .0039 | + | –5.75 |
| 7 | .0049 | + | –5.25 |
| 8 | .0059 | + | –4.75 |
| 9 | .0382 | + | –4.25 |
| 10 | .0559 | + | –3.75 |
| 11 | .0059 | – | –3.25 |
| 12 | .0321 | – | –2.75 |
| 13 | .0901 | + | –2.25 |
| 14 | .1058 | + | –1.75 |
| 15 | .2519 | – | –1.25 |
| 16 | .5787 | – | –0.75 |
| 17 | .2344 | – | –0.25 |
| 18 | .5510 | – | +0.25 |
| 19 | .8861 | + | +0.75 |
| 20 | .5414 | + | +1.25 |
| 21 | .1584 | + | +1.75 |
| 22 | .1428 | + | +2.25 |
| 23 | .2298 | + | +2.75 |
| 24 | .1662 | + | +3.25 |
| 25 | .0671 | + | +3.75 |
| 26 | .0494 | + | +4.25 |
| 27 | .0499 | + | +4.75 |
| 28 | .0239 | + | +5.25 |
| 29 | .0036 | + | +5.75 |
| 30 | .0042 | – | +6.25 |
| 31 | .0136 | – | +6.75 |
| 32 | .0169 | – | +7.25 |
| 33 | .0123 | – | +7.75 |
| 34 | .0109 | – | +8.25 |

The outputs of networks 100 and 200 are step-like sampled waveforms and therefore contain high frequency harmonic components. The output of network 100 is connected to low pass filter 82 and the output of network 200 is connected to low pass filter 84 to remove the high frequency components of these step-like waveforms generated by the sampling method used to create thse waveforms.

I have chosen to use TTL integrated circuits to implement shift register 40. In order to eliminate variations in the output voltage of the shift register stages, pull-up resistors 301 through 334 have been connected to the output of each shift register stage 1 through 34 respectively. The other terminal of each pull-up resistor is connected to a positive voltage supply +V. Each of resistors 301 through 334 is chosen to have a resistance value much smaller than the resistance of weighting resistors 101–134 and 201–234, so that its effect on the weighted output from each stage of memory 40 is negligible. If a memory having more closely controlled output voltage levels is used for memory 40, the pull-up resistors will not be needed.

Now that the baseband signal and the transforms have been generated, a vestigial sideband signal can be created by the phase shift method usually used to create single sideband signals. To this end, the output of low pass filter 82 connected to the input of balanced modulator 76 and the output of low pass filter 84 is connected to the input of balanced modulator 74. A carrier oscillator 70 provides a carrier signal to the balanced modulator 76 and a phase shift circuit 72 provides a qradrature carrier to balanced modulator 74. The outputs of the balanced modulator 76 and 74 are connected to summing circuit 50 in order to cancel out part of one of the sidebands. Summing circuit 50 comprises operational amplifier 59, feedback resistor 51, connected between the amplifier output and its negative input, resistor 56 connected between the amplifier positive input and ground, and summing resistors 57 and 53 in series with inputs from balanced modulators 76 and 74 respectively. A vestigial sideband signal appears at the output of summing circuit 50. Low pass filter 80 is connected to the output of summing circuit 50 in order to remove unwanted high frequency harmonic components generated by the modulation process if square waveform carriers are used. Low-pass filters 80, 82 and 84 are simple and easy to design filters which need not have a sharp rolloff and therefore do not introduce significant phase distortion or other distortions.

OPERATION

The apparatus embodying my invention operates as follows:

Serial memory means 40 in conjunction with baseband sample generator means 100 generates a baseband waveform having an amplitude spectrum which is limited to a finite bandwidth and which contains the digital information to be transmitted. The shape of this baseband waveform is determined by the values of the resistors as set out in Table I. Since the shape of the baseband waveform is chosen to minimize intersymbol interference and to keep the information within the available bandwidth, several waveforms are suitable and applicant's invention should not be considered to be limited to the raised cosine rolloff waveform defined by the values of Table I. For example, a linear rolloff waveform also fulfills Nyquist's criteria for minimizing intersymbol interference and could be used in place of the raised cosine rolloff waveform defined by the values of Table I. Referring again to FIG. 1, serial memory means 40 accepts digital data to be transmitted at the input to AND gate 35 which is labeled DATA IN. The data is gated into first shift register stage by a gate clock signal on the line labeled GATE CLOCK at a frequency equal to the transmitting data rate frequency desired. After being gated into serial memory 40, the data is propagated through memory 40, by a shift clock signal on the line labeled SHIFT CLOCK. The frequency of the shift clock signal must be equal to twice the frequency of the gate clock or greater. As each shift clock pulse shifts data within the serial memory 40, the outputs of each stage of serial memory 40 will be at a first level such as +V volts if any portion of a data bit is stored in the stage. Each resistor of network 100 weights the output voltage of one of the stages of serial memory 40. The summing circuit of network 100 sums all of the weighted voltages to generate a single voltage sample of that baseband waveform representing the data stored in serial memory 40. Since a new sample is generated for each shift clock pulse, the sampling rate is equal to the shift clock frequency.

Serial memory means 40 and transform sample generator network 200 generate a transform of the baseband waveform previously generated. The waveform of the transform is determined by the values of the resistors set out in Tables II and III. Since the transform is a transform of the baseband waveform which may be chosen as desired, the values of Tables II and III will vary as the values of Table I are varied, therefore, Applicant's invention should not be construed as limited to the waveforms created by the resistor values of Tables II and III. As each shift clock pulse shifts data within the serial memory 40, each resistor of network 200 weights the output voltage of one of the stages of serial memory 40. The summing circuit of network 200 sums all of the weighted voltages to generate a single sample of the transform of that above generated baseband waveform representing the data stored in serial memory 40. If a single data bit is propagated through serial memory 40, a series of waveform samples will be generated which will define a waveform indentical to the waveform defined by the values and node connections (negative or positive) of the resistors of network 200.

After being generated in the form of a plurality of discrete flat-top samples, the baseband data waveform and its transform are filtered in low pass filters 82 and 84, to remove high frequency components introduced by the sampling process.

Balanced modulators 76 and 74 modulate the baseband waveform and the transform of the baseband waveform onto a carrier signal and a quadrature carrier signal respectively, in order to generate two double sideband suppressed carrier signals.

Summing circuit 50 sums these two double sideband suppressed carrier signals and partially cancels one of the sidebands in the process, as explained earlier with the aid of equations (9) and (22).

Low pass filter 80 removes unwanted high frequency components generated by the modulation process, leaving a true vestigial sideband signal ready for transmission to any vestigial sideband receiver known in the prior art.

While my invention has been particularly shown and described with reference to preferred embodiments thereof, it will be understood by those skilled in the art, that the foregoing baseband waveform modifications suggested and other changes in form and detail may be made without departing from the spirit and scope of my invention, which is to generate a vestigial sideband signal without the need for a vestigial sideband filter. For example, while I have disclosed embodiments of a two level VSB signal generator my invention can be applied by those of ordinary skill in the art to four level or eight level VSB signal generation as well.

What I claim is:

1. The method of generating a single vestigial sideband signal suitable for transmission of digital information comprising the steps of:

generating a first waveform $g(t)$ having an amplitude spectrum which is limited to a finite bandwidth from $-\omega_o-\omega_a$ to $\omega_o+\omega_a$, said first waveform containing the digital information to be transmitted, wherein $\omega_a$ is one-half of the bandwidth of raised cosine rolloff, and $\omega_o$ is the Nyquist bandwidth of the baseband information signal;

generating a transform of said first waveform having even symmetry amplitude rolloff about zero frequency within a bandwidth from $-\omega_b$ to $\omega_b$;

said transform containing said information to be transmitted;

modulating said first waveform in a balanced modulator onto a first carrier signal $\cos\omega_c t$ to provide a first double sideband suppressed carrier output;

modulating said transform in a balanced modulator onto a second carrier signal $\cos(\omega_c t+90°)$ to provide a second double sideband suppressed carrier output;

summing said first output and said second output to cancel part of one of said sidebands leaving a vestigial sideband signal, wherein $\omega b$ is one-half of the bandwidth of the vestigial sideband region.

2. The method of claim 1 wherein said even symmetry amplitude rolloff is a sine rolloff in accordance with the equation for the transform $h'(t)$ of said first waveform $g(t)$ $$h'(t)=\frac{T}{\pi}\int_0^{\omega_b}\sin\frac{\pi\omega}{2\omega_b}\sin\omega t\,d\omega+\frac{T}{\pi}\int_{\omega_b}^{\omega_o-\omega_a}\sin\omega t\,d\omega+\frac{T}{2\pi}\int_{\omega_o-\omega_a}^{\omega_o+\omega_a}\left[1-\sin\frac{\pi(\omega-\omega_o)}{2\omega_a}\right]\sin\omega t\,d\omega$$

wherein $\omega_a$ is one-half of the bandwidth of raised cosine rolloff, $\omega_b$ is one-half of the bandwidth of the vestigial sideband region, and $\omega_o$ is the Nyquist bandwidth of the baseband information signal.

3. The method of claim 1 wherein said even symmetry amplitude rolloff is linear rolloff in accordance with the equation for the transform $h''(t)$ of said first waveform $g(t)$ $$h''(t)=\frac{T}{\pi}\int_0^{\omega_b}\frac{\omega}{\omega_b}\sin\omega t\,d\omega+\frac{T}{\pi}\int_{\omega_b}^{\omega_o-\omega_a}\sin\omega t\,d\omega+\frac{T}{2\pi}\int_{\omega_o-\omega_a}^{\omega_o+\omega_a}\left[1-\sin\frac{\pi(\omega-\omega_o)}{2\omega_a}\right]\sin\omega t\,d\omega$$

wherein $\omega_a$ is one-half of the bandwidth of raised cosine rolloff, $\omega_b$ is one-half of the bandwidth of the vestigial sideband region, and $\omega_o$ is the Nyquist bandwidth of the baseband information signal.

4. The method of generating a single vestigial sideband signal suitable for transmission of digital information comprising the steps of:

generating a first waveform $g(t)$ having an amplitude spectrum which is limited to a finite bandwidth from $-\omega_o-\ {}_a$ to $\omega_o+\omega_a$, wherein $\omega_a$ is one-half of the bandwidth of raised cosine rolloff, and $\omega_o$ is the Nyquist bandwidth of the baseband information signal, said first waveform containing the digital information to be transmitted;

generating a transform of said first waveform having odd symmetry phase rolloff about zero frequency within a bandwidth from $-\omega_b$ to $\omega_b$ said transform containing said information to be transmitted;

modulating said first waveform in a balance modulator onto a first carrier signal $\cos\omega_c t$ to provide a a first double sideband suppressed carrier output;

modulading said transform in a balanced modulator onto a second carrier signal $\cos(\omega_c t+90°)$ to provide a second double sideband suppressed carrier output;

summing said first output and said second output to cancel part of one of said sidebands leaving a vestigial sideband signal, wherein $\omega b$ is one-half of the bandwidth of the vestigial sideband region.

5. The method of claim 4 wherein said odd symmetry phase rolloff is a sine rolloff in accordance with the equation for the transform $h'''(t)$ of said first waveform $g(t)$ $$h'''(t)=\frac{T}{\pi}\int_0^{\omega_b}\cos\left(\omega t-\sin\frac{\pi\omega}{2\omega_b}\right)d\omega+\frac{T}{\pi}\int_{\omega_b}^{\omega_o-\omega_a}\sin\omega t\,d\omega+\frac{T}{2\pi}\int_{\omega_o-\omega_a}^{\omega_o+\omega_a}\left[1-\sin\frac{\pi(\omega-\omega_o)}{2\omega_a}\right]\sin\omega t\,d\omega$$

wherein $\omega_a$ is one-half of the bandwidth of raised cosine rolloff, $\omega b$ is one-half of the bandwidth of the vestigial sideband region, and $\omega_o$ is the Nyquist bandwidth of the baseband information signal.

6. The method of claim 4 wherein said odd symmetry phase rolloff is a linear rolloff in accordance with the equation for the transform $h''''(t)$ of said first waveform $g(t)$ $$h'''(t)=\frac{T}{\pi}\int_0^{\omega_b}\cos\left(\omega t-\frac{\pi\omega}{2\omega_b}\right)d\omega+\frac{T}{\pi}\int_{\omega_b}^{\omega_o-\omega_a}\sin\omega t\,d\omega+\frac{T}{2\pi}\int_{\omega_o-\omega_a}^{\omega_o+\omega_a}\left[1-\sin\frac{\pi(\omega-\omega_o)}{2\omega_a}\right]\sin\omega t\,d\omega$$

wherein $\omega_a$ is one-half of the bandwidth of raised cosine rolloff, $\omega_b$ is one-half of the bandwidth of the vestigial sideband region, and $\omega_o$ is the Nyquist bandwidth of the baseband information signal.

7. Apparatus for generating a single vestigial sideband signal by the phase shift method comprising:

a source of digital information;

a shift clock;

serial memory means having a plurality of stages, each of said stages having an output;

first circuit means connecting said source to said serial memory means;

second circuit means connecting said shift clock to said serial memory means to propagate digital information through each of said stages;

baseband sample generator means having a first plurality of 34 resistors, 1–34 respectively, each of said resistors being connected to a different one of said outputs of said stages, the other end of each of said resistors being connected to a first summing means so that the inverse of each of the 34 values .0024, .0017, .0019, .0026, .0012, .0012, .0055, .0080, .0169, .0248, .0413, .0530, .0845, .1119, .1906, .2808, .9265, .9265, .2808, .1906, .1119, .0845, .0530, .0413, .0248, .0169, .0080, .0055, .0012, .0012, .0026, .0019, .0017 and .0024, respectively, for each of said plurality of resistors 1–34, respectively, define a first waveform having an amplitude spectrum which is limited to a finite bandwidth, said baseband sample generator means generating at an output of said summing means, amplitude samples of the first waveform containing said digital information;

transform sample generator means having a second plurality of 34 resistors, 35–68, respectively, each of said second plurality of resistors being connected to a different one of said outputs of said stages, the other end of each of said second plurality of resistors being connected to a second summing means so that the inverse of each of the 34 values .0006, .0006, 0054, .0054, .0000, .0000, .0095, .0220, .0056, .0056, .0861, .1310, .0263, .9263, .3967, .7324, .3927, .3927, .7324, .3967, .0263, .0263, .1310, .0861, .0056, .0056, .0220, .0095, .0000, .0000, .0045, .0054, .0006 and .0006, respectively, of said second plurality of resistors 35–68, respectively, define a second waveform which is a transform of said first waveform, said transform sample generator means generating at an output of said second summing means, a sample of the second waveform which is a transform of said first waveform having even symmetry sinusoidal amplitude rolloff about zero frequency;

first low-pass filter means connected to the output of said first summing means for removing high frequency components from said first waveform;

second low-pass filter means connected to the output of said second summing means for removing high frequency components from said second waveform;

balanced modulator means connected to said first low-pass filter means for modulating said first waveform onto a first carrier;

second modulator means connected to the output of said second low-pass filter means for modulating said second waveform onto a second carrier which is in quadrature phase relationship with said first carrier;

summing means connected to the output of said balanced modulator means and the output of said second modulator means for cancelling part of one of the sidebands appearing in the outputs of both modulator means, leaving a single vestigial sideband signal.

8. Apparatus for generating a single vestigial sideband signal by the phase shift method comprising:

a source of digital information;

a shift clock;

serial memory means having a plurality of stages, each of said stages having an output;

first circuit means connecting said source to said serial memory means;

second circuit means connecting said shift clock to said serial memory means to propagate digital information through each of said stages;

baseband sample generator means having a first plurality of 34 resistors, 1–34 respectively, each of said resistors being connected to a different one of said outputs of said stages, the other end of each of said resistors being connected to a first summing means so that the inverse of each of the 34 values .0024, .0017, .0019, .0026, .0012, .0012, .0055, .0080, .0169, .0248, .0413, .0530, .0845, .1119, .1906, .2808, .9265, .9265, .2808, .1906, .1119, .0845, .0530, .0413, .0248, .0169, .0080, .0055, .0012, .0012, .0026, .0019, .0017 and .0024, respectively, for each of said plurality of resistors 1–34, respectively, define a first waveform having an amplitude spectrum which is limited to a finite bandwidth, said baseband sample generator means generating at an output of said summing means, amplitude samples of the first waveform containing said digital information;

transform sample generator means having a second plurality of 34 resistors, 35–68, respectively, each of said second plurality of resistors being connected to a different one of said outputs of said stages, the other end of each of said second plurality of resistors being connected to a second summing means so that the inverse of each of the 34 values .0097, .0111, .0061, .0046, .0041, .0039, .0049, .0059, .0382, .0559, .0059, .0321, .0910, .1058, .2519, .5787, .2344, .5510, .8861, .5414, .1584, .1428, .2298, .1662, .0671, .0494, .0499, .0239, .0036, .0042, .0136, .0169, .0123 and .0109, respectively, of said second plurality of resistors 35–68, respectively, define a second waveform which is a transform of said first waveform, said transform sample generator means generating at an output of said second summing means, a sample of the second waveform which is a transform of said first waveform having odd symmetry linear phase rolloff about zero frequency;

first low-pass filter means connected to the output of said first summing means for removing high frequency components from said first waveform;

second low-pass filter means connected to the output of said second summing means for removing high frequency components from said second waveform;

balanced modulator means connected to said first low-pass filter means for modulating said first waveform onto a first carrier;

second modulator means connected to the output of said second low-pass filter means for modulating said second waveform onto a second carrier which is in quadrature phase relationship with said first carrier;

summing means connected to the output of said balanced modulator means for cancelling part of one of the sidebands appearing in the outputs of both modulator means, leaving a single vestigial sideband signal.

* * * * *

PO-1050
(5/69)

UNITED STATES PATENT OFFICE
CERTIFICATE OF CORRECTION

Patent No. 3,835,391 Dated September 10, 1974

Inventor(s) Yang Fang

It is certified that error appears in the above-identified patent and that said Letters Patent are hereby corrected as shown below:

Column 13, Equation 36, second line of Equation 36, "$\omega_o \omega_a$" should be --$\omega_o - \omega_a$ --; third line of Equation 36, "1 - sin" should be --[1 - sin--.

Column 17, Claim 1, line 24, after $\omega_b$ insert -- , the symbol--; line 36, "ωb" should be --$\omega_b$ --.

Column 18, Claim 4, line 6, "from $-\omega_o$ - a to" should read -- from $-\omega_o - \omega_a$ to --; line 13, after $\omega_b$ insert -- , the symbol; --; line 17, after provide a, delete "a"; line 19, change "moduladìng" to -- modulating--; line 25, change "ωb" to -- $\omega_b$ --; Claim 5, line 34, change "ωb" to --$\omega_b$--; Claim 6, line 44, Equation should be changed from "h'''(t)" to --h''''(t)--.

Column 19, Claim 7, line 28, ".9263" should be -- .0263 --.

Column 20, Claim 8, line 33, ".0910" should be -- .0901 --.

Signed and sealed this 8th day of April 1975.

(SEAL)
Attest:

RUTH C. MASON
Attesting Officer

C. MARSHALL DANN
Commissioner of Patents
and Trademarks